United States Patent [19]

Blahut et al.

[11] 4,399,516
[45] Aug. 16, 1983

[54] STORED-PROGRAM CONTROL MACHINE

[75] Inventors: Donald E. Blahut, Holmdel; Marc L. Harrison, Morganville; Michael J. Killian, Eatontown; Mark E. Thierbach, Lincroft, all of N.J.

[73] Assignee: Bell Telephone Laboratories, Incorporated, Murray Hill, N.J.

[21] Appl. No.: 233,143

[22] Filed: Feb. 10, 1981

[51] Int. Cl.[3] ............................................. G06F 9/22
[52] U.S. Cl. .................................... 364/716; 364/900
[58] Field of Search .............................. 364/716, 900; 340/825.83; 307/465

[56] References Cited

U.S. PATENT DOCUMENTS

| 3,959,774 | 5/1976 | Mead | 364/200 |
| 3,983,538 | 9/1976 | Jones | 364/900 |
| 4,034,356 | 7/1977 | Howley | 307/465 |
| 4,037,089 | 7/1977 | Horninger | 364/716 |
| 4,237,542 | 12/1980 | Cukier | 364/900 |
| 4,268,908 | 5/1981 | Logue et al. | 364/716 X |

OTHER PUBLICATIONS

Elliott et al., "Array Logic Processing", *IBM Tech. Disclosure Bulletin*, vol. 16, No. 2, Jul. 1973, pp. 586-587.

Pilost et al., "Latched Inputs-An Improvement to PLA", *IBM Tech. Disclosure Bulletin*, vol. 20, No. 11A, Apr. 1978, pp. 4438-4439.

Mead et al., Introduction to VLSI Systems, Addison-Wesley, 1980, p. 81.

*Primary Examiner*—David H. Malzahn
*Attorney, Agent, or Firm*—Herbert M. Shapiro

[57] ABSTRACT

A hierarchical organization of programmable logic arrays permits the control of microprocessor functions to be achieved in a way which allows otherwise wasted clock time to be used. The mostly independent operations of the several PLA's is organized by "handshake" signals from the latches of one PLA to those of another via AND circuits operative to selectively enable clock signals, in some instances, and data in other instances, to be applied to the latches. The use of the AND circuits enables requisite operations to be achieved with relatively small PLA's.

10 Claims, 10 Drawing Figures

STORED-PROGRAM CONTROL MACHINE

FIELD OF THE INVENTION

This invention relates to stored-program control machines and, more particularly to semiconductor integrated circuits such as microprocessors for implementing such machines.

BACKGROUND OF THE INVENTION

A microprocessor generally is accepted to include various elements of a computer on a single chip of semiconductor material with the possible exception of memory (Program and Data Store).

The various processing functions of a microprocessor are carried out in an area of the chip which includes registers and an arithmetic logic unit and is referred to as the data path portion of the chip. The cooperation between the various elements of the data path portion as well as the sequences in which those elements cooperate is determined by sequences of outputs generated by a programmable logic array (PLA) and applied in a manner to control the data path portion of the chip. See "Introduction to VLSI Systems" by Carver Mead and Lynn Conway, Addison-Wesley, 1980 for a full explanation of PLA's.

A PLA includes a decoder section and a read only memory (ROM) section with associated input and output registers respectively. The decoder section is known as an "AND" plane and includes a drive line for each input term and one for each complement term. Each of the drive and complement lines intersect electrically conducting output lines which extend into the ROM section where they become "word" lines. The lines which intersect the drive and complement lines are called decoder output lines. At selected intersections in the decoder section, pulldown transistors are formed. The transistors respond to various input codes to ground selected decoder output lines. The outputs of the AND plane thus are determined by the locations and gate connections of pulldown transistors connected to the decoder output lines.

The ROM section of a PLA also includes output lines which intersect the word lines. Again, pulldown transistors are formed at selected ones of those intersections with transistor gates connected to the word lines. In the case of CMOS logic, if the gate of any transistor connected to a decoder output line is at a high (low) voltage, that entire output line is at a low voltage as is the associated word line in the ROM section. By a selective placement of transistors in both the decoder section and the ROM section of a PLA, a particular output code appears on the ROM output lines for each input code applied to the inputs of the decoder section. In this manner, instructions of an input program are decoded into a sequence of cycle-by-cycle actions. A representation of the repertoire of actions is termed a state diagram.

The action to be performed during a give two phase cycle ($\phi_1$ and $\phi_2$) is defined at the output of a ROM section of a PLA at an output register clocked during phase $\phi_2$ of a two phase clock cycle. An input register to the PLA is operative to store, in a $\phi_1$ phase, input data that were applied to it during the immediately preceding $\phi_2$ phase.

As the number of operations performed by the elements of the data path portion of a microprocessor chip increases, so does the requisite number of cycle-by-cycle actions. The number of distinct actions that a PLA can invoke is a function of the number of word lines. Consequently, the PLA has to increase in size in order to invoke an increased number of actions. Since the available area on a semiconductor chip is limited, the space available for the PLA is also limited. Further, as the PLA increases in size it operates more slowly and thus limits the clock rate of the entire device. The problem thus is to implement a requisite logic function with a PLA of relatively reduced area.

BRIEF DESCRIPTION OF THE INVENTION

The foregoing problem is solved in several ways in accordance with this invention. One solution involves the combination of logic circuitry with a PLA to implement the function of a state diagram implemented in the prior art only with a relatively large PLA. In a preferred solution two or more separate PLA's are cooperative in a manner to implement the function of a single prior art PLA. Particularly, the interconnection of two or more finite state (control program) machines via at least one electrical path which may or may not include logic is considered a significant departure from prior art thinking.

In one embodiment herein the problem is solved by applying the normal clock pulse to the input register of a PLA by way of an AND circuit which can be enabled at controlled times in a clock cycle. In the absence of the AND circuit, whenever a phase $\phi_1$ clock pulse occurs in each cycle of operation, a PLA output (state) is required to orchestrate operation of the elements of the data path portion or to orchestrate a pause during the next consecutive $\phi_2$ phase operation. Additional ROM word lines are required to generate the same state in a next consecutive clock cycles, and the repertoire of a relatively large PLA results. The use, for example, of an AND circuit to inhibit the clock permits the number of output states to be reduced. Concomitants to this reduction are a reduction in the requisite number of word lines, a reduction in the requisite PLA area, and an increase in speed.

With the AND circuit present, an enable signal, termed a "wait" signal, can be applied to provide for state continuance during a next consecutive $\phi_1$ phase. Pause states and associated word lines are obviated. The inclusion of means for enabling a logic element for applying a clock pulse to an input register to a PLA is also considered a significant departure from prior art thinking.

The arrangement is particularly useful for a microprocessor which includes two or more PLA's each illustratively dedicated to associated elements in the data path portion of the chip. Each PLA and its associated data path elements form a unit of operation (i.e., addition or subtraction) which are operative largely independently of one another, being constrained primarily in that other largely independent operations are necessarily coordinated in order to achieve the usual kinds of processing results. The coordination typically is accomplished by a first PLA applying an enable "wait" signal to a second PLA. The signal operates to disable an AND circuit to inhibit an input clock signal to the second PLA. The coordination of multiple PLA's, particularly with each PLA having processing elements associated exclusively with it, is considered another departure from prior art thinking and leads to a powerful hierarchical PLA control arrangement.

Copending application Ser. No. 233,107 filed on even date herewith for Marc. L. Harrison discloses the use of logic elements between master-slave latches for performing processing during otherwise unused time which occurs between the $\phi_1$ and $\phi_2$ pulses of a standard clock cycle. The present invention capitalizes on the use of such logic primarily to reduce PLA complexity by gating timing pulses and/or also to achieve such ends by gating data. In both cases, hierarchical PLA controls are achieved.

DETAILED DESCRIPTION

Figure 1:
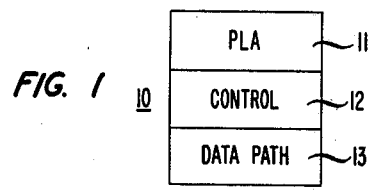
FIG. 1 shows a schematic block diagram of a microprocessor organization.
Figure 2:
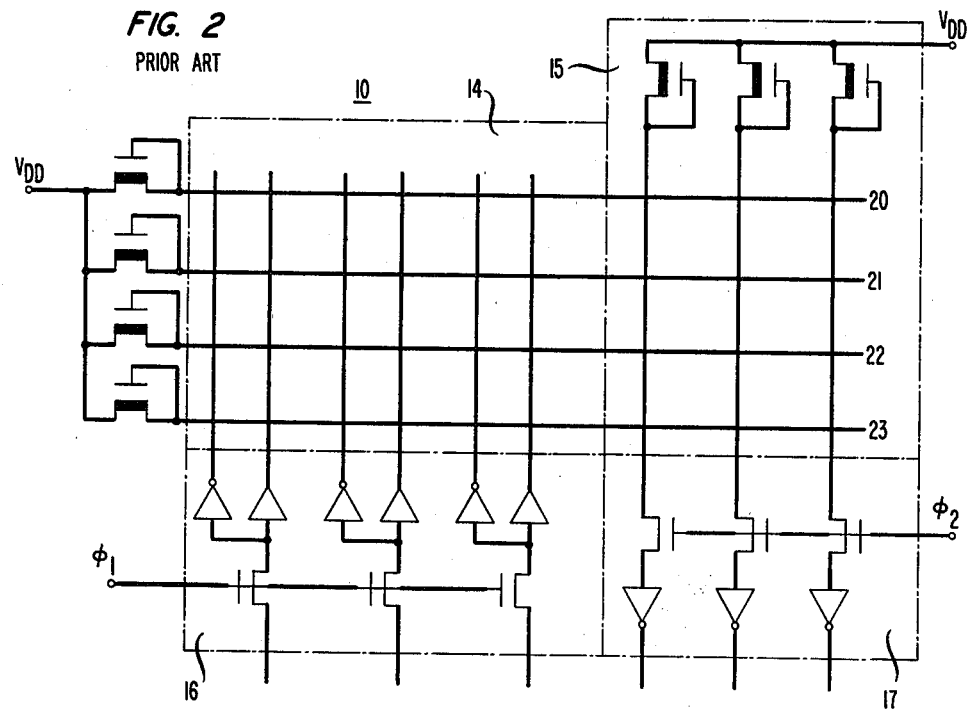
FIGS. 2 and 3 show a prior art PLA arrangement in some detail and in schematic form, respectively.
Figure 3:
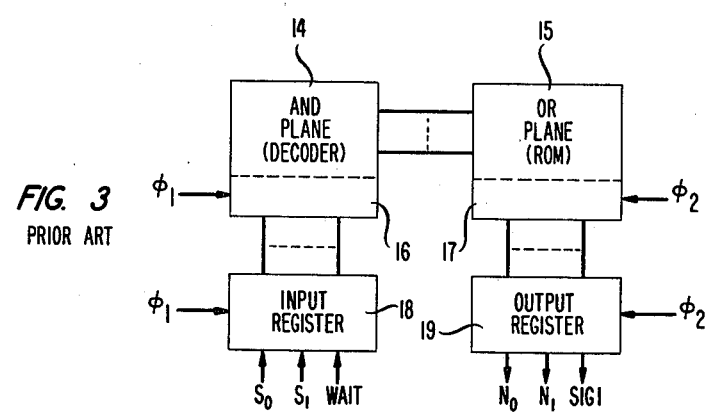

FIG. 1 shows a semiconductor integrated circuit chip 10 including a PLA, a control, and a data path portion 11, 12, and 13, respectively. FIG. 2 shows a prior art arrangement for the PLA portion of FIG. 1. The arrangement includes the conventional components, namely the decoder portion 14 (the AND plane), the ROM portion 15 (the OR plane), and the associated input and output buffers 16 and 17, respectively. FIG. 2 shows the arrangement in some detail; FIG. 3 shows the arrangement schematically with the addition that the familiar input and output registers (latches) 18 and 19 are shown connected to the buffers. FIG. 3 also shows two phase clock signals $\phi_1$ and $\phi_2$ being applied to input register 18 and to output register 19, respectively.

The circuit typically includes an array of transistors (not shown) in the decoder and in the ROM sections to define the specific pattern of bits generated by the output register in response to a particular input code as per the representative state diagram. The array of transistors is not being shown because a discussion of the generation of a particular pattern of bits is unnecessary to an understanding of the invention. All that is important here is that the arrangement of FIG. 2 shows four word lines 20, 21, 22, and 23 which permit a number of potentially different binary output words at the input of output register 19.

Figure 4:
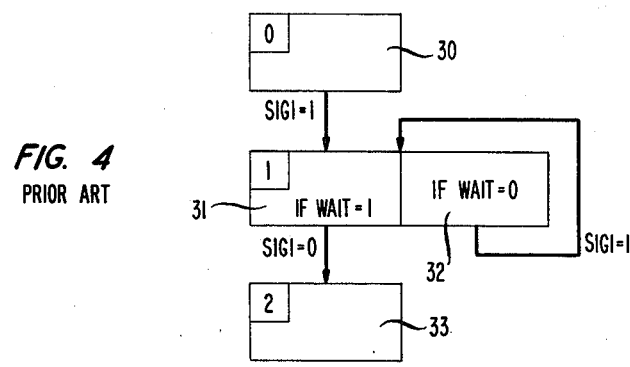
FIGS. 4 and 7 are state diagrams for the arrangements of FIGS. 2 and 5, respectively.

A simple state diagram for the arrangement of FIGS. 2 and 3 is shown in FIG. 4. The possible input bits $S_o$, $S_1$, and wait are shown in FIG. 3. The possible output bits are $N_1$, $N_o$ and SIG1. Four states are shown, one represented by each of blocks 30, 31, 32, and 33 in FIG. 4. The operation represented in FIG. 3 typically requires four word lines in the decoder and ROM portions of the PLA.

Figure 5:
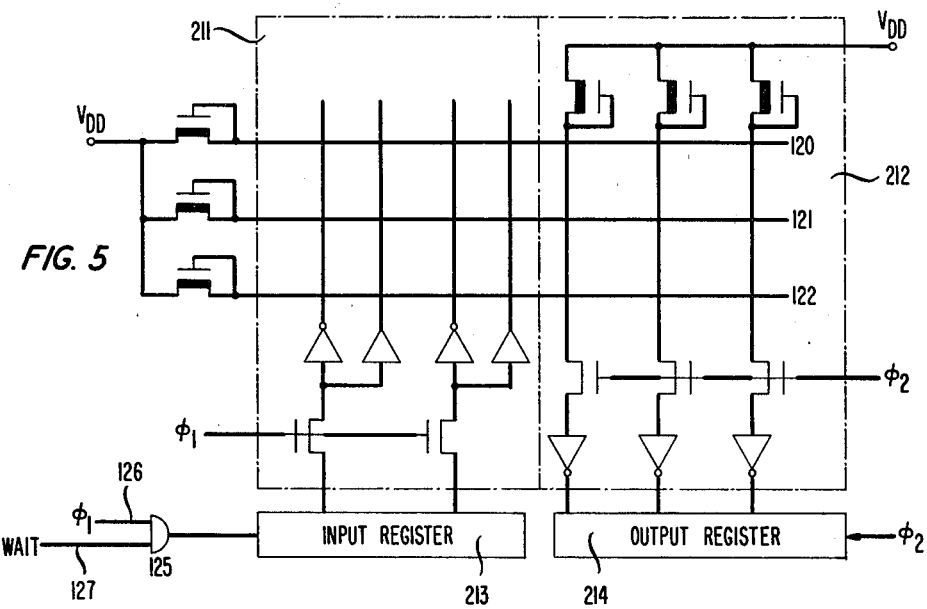
FIGS. 5 and 6 show, in some detail and schematically, respectively a PLA arrangement in accordance with one embodiment of this invention.
Figure 6:
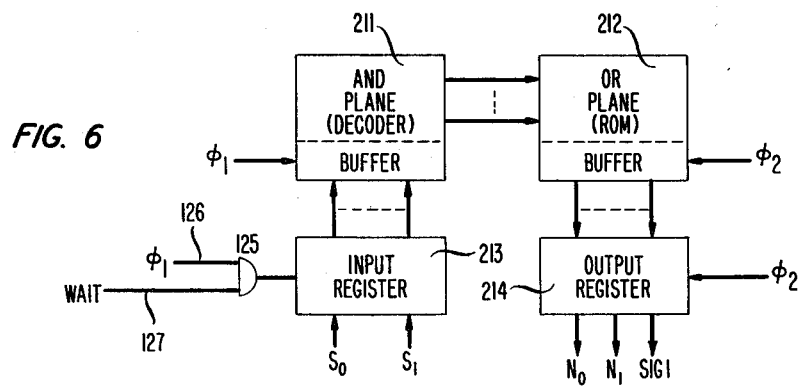
Figure 7:
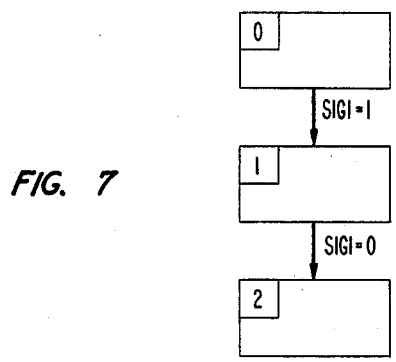

FIGS. 5 and 6 show, in detail and schematically, respectively, a PLA arrangement in accordance with an embodiment of this invention. A comparison of FIGS. 5 and 2 shows that the arrangement of FIG. 5 has only three word lines, namely 120, 121, and 122. The arrangement of FIG. 5 does, on the other hand, include an AND circuit 125 connected to an input 126 to which clock signal $\phi_1$ is applied. An enable signal "wait" is applied selectively to a second input 127 of AND circuit 125. FIG. 7 shows the state diagram for the embodiment of FIGS. 5 and 6. It can be seen from a comparison of the state diagram of FIGS. 4 and 7 that the described operations are achieved with fewer word lines and one fewer input in the arrangement of FIGS. 5 and 6.

AND circuit 125 is shown in FIG. 6 also. The AND and OR planes in FIGS. 5 and 6 are designated 211 and 212, the corresponding input and output registers being designated 213 and 214, respectively. The wait signal is operative to gate the clock ($\phi_1$) pulse for the entire input code in this embodiment.

Figure 8:
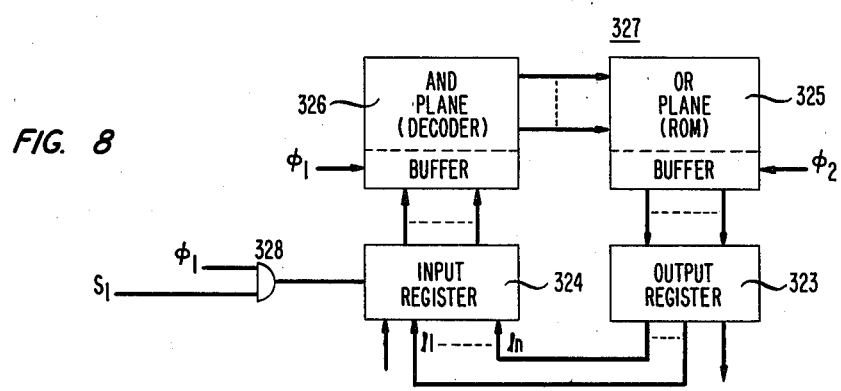
FIGS. 8, 9, and 10 are schematic diagrams of alternative embodiments of this invention.

In a related embodiment of FIG. 8, a plurality of feedback loops are connected between the output register and the input register 323 and 324, respectively, of a ROM section and a decoder section 325 and 326 of a PLA 327. The feedback loops are designated $l_1 \ldots l_n$. An AND circuit 328 is employed in a manner similar to that shown in FIG. 6. The presence of such loops also is implied by the state diagram of FIGS. 4 and 7. Consequently, each of the arrangements of FIGS. 3 and 6 may include feedback loops and FIG. 8 is intended to illustrate the presence of such loops.

Figure 9:
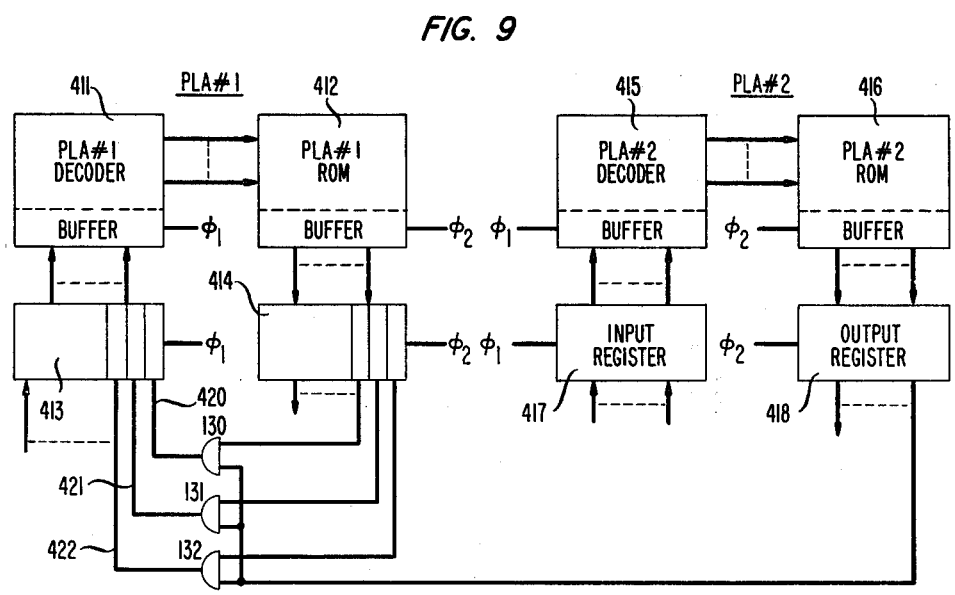

FIG. 9 shows an embodiment in which signals in feedback loops between the ROM section of a PLA and the decoder section of the same PLA as shown in FIG. 8 are selectively inhibited by a signal from a second PLA. The figure shows decoder and ROM sections 411 and 412 of a first PLA along with input and output registers 413 and 414. Decoder and ROM sections 415 and 416 of a second PLA along with input and output registers 417 and 418 are also shown. Representative feedback loops 420, 421, and 422 interconnect outputs of register 414 to input register 413. Each feedback loop includes an AND circuit, and an output of register 418 of PLA #2 is connected to an input of each of the AND circuits. The AND circuits are designated 130, 131, and 132 for loops 420, 421, and 422, respectively.

We have seen that the provision of a control signal to a logic circuit such as an AND circuit to selectively enable clock pulses to be applied to an input register of a PLA results in the realization of a given set of operations with a PLA of reduced size. A like reduction in size is achieved with the embodiment of FIG. 9, again capitalizing on the use of a logic circuit but in this instance for processing data between $\phi_1$ and $\phi_2$ phases of a clock cycle. For the examples given, a reduction of the number of word lines of 25% is achieved. In a practical embodiment, a typical prior art PLA may contain 150 word lines which number is reduced to slightly over 100 by the use of a logic circuit in accordance with the foregoing discussion. Again size reductions of about 25% are achieved. We will now show that the judicious use of such AND circuits enables a hierarchical PLA architecture to be achieved, leading to improved microprocessor operation as well as to a reduction in size.

Figure 10:
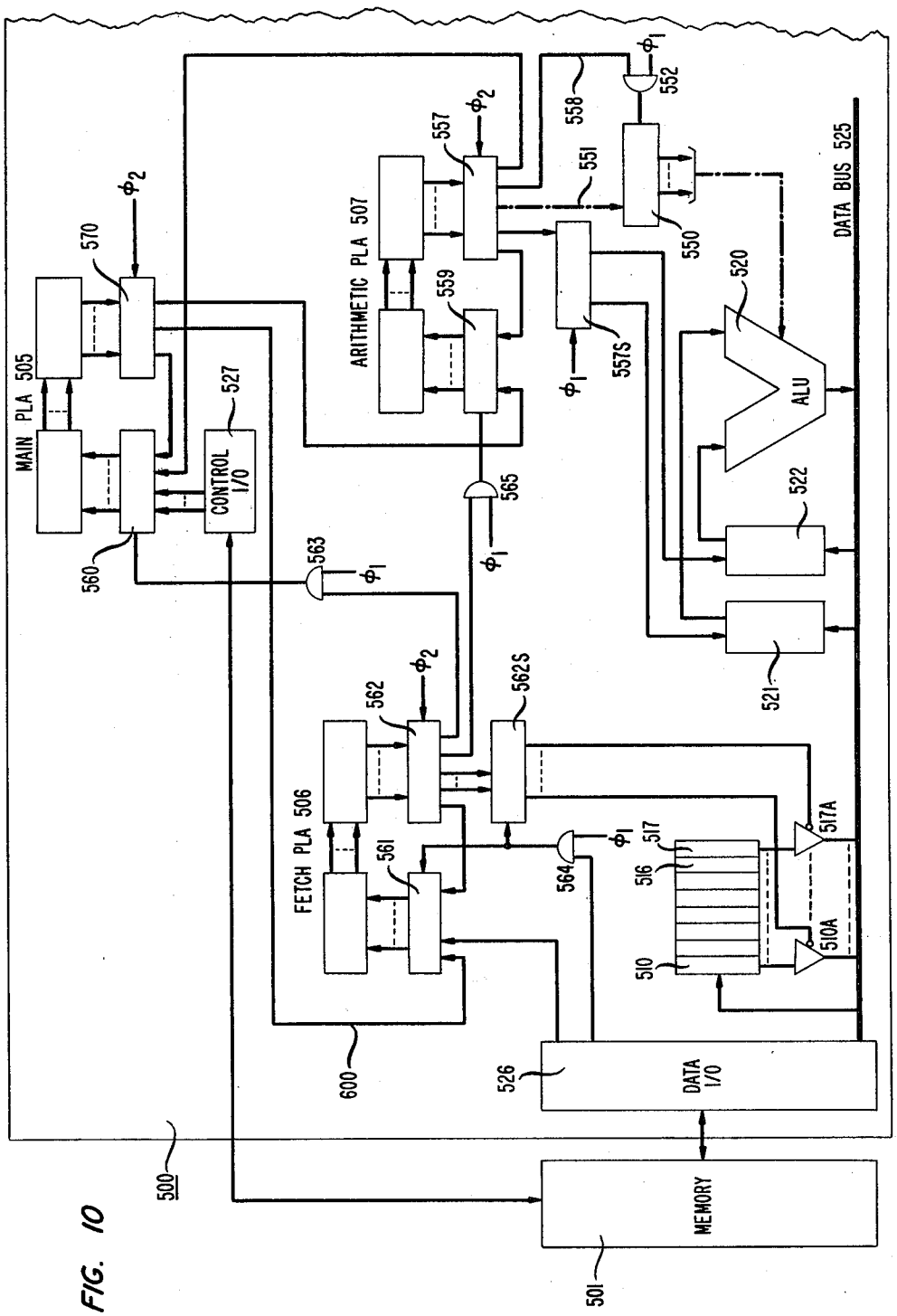

FIG. 10 shows a portion of a semiconductor microprocessor chip 500 and a memory 501 external to the chip. The microprocessor includes a Main PLA 505, a Fetch PLA 506, and an Arithmetic PLA 507. PLA 506 is associated with user registers 510, . . . 517 and with associated output tri-state buffers 510A, . . . 517A. PLA 507 is associated with arithmetic logic 520. The microprocessor also includes two temporary registers 521 and 522, and data bus 525. Data and control inputs and outputs (I/O) units are designated 526 and 527, respectively.

The first illustrative operation of the arrangement of FIG. 10 is directed at moving the contents of two selected user registers 510 ... 517 to the temporary registers 521 and 522 under the control of Fetch PLA 506 and, thereafter, to carry out an "add" operation in ALU 520 under the control of Arithmetic PLA 507. Both PLA's 506 and 507 are under the control of Main PLA 505 during the operation, and the PLA's are interconnected in a manner to enable clock pulses to be applied to input registers as described in connection with FIG. 6.

We will adopt the convention that action starts on a ($\phi_1$) clock cycle at which time the Main PLA is assumed to receive a valid command input from control I/O 527. On the next subsequent phase ($\phi_2$), Main PLA 505 applies its valid output to the input registers 561 and 559 of the Fetch and the Arithmetic PLA's 506 and 507. On the following phase $\phi_1$, PLA's 506 and 507 have valid command inputs. On the next phase $\phi_2$, the Fetch PLA applies an output to a selected one of tri-state buffer circuits 510A, 511A, 512A, ... 517A and activates one user register. Outputs from the selected register are applied to bus 525. During this phase, PLA 507 enables temporary register 521 to receive data from bus 525.

During the next $\phi_1$ phase (cycle 3), the Fetch and Arithmetic PLA's receive a second valid command input. During the following $\phi_2$ phase, data from a second user register is applied to bus 525, and temporary register 522 is enabled. The operation to this point has resulted in data in first and second user registers to be stored in first and second temporary registers 521 and 522.

The fourth cycle of operation commences on a phase $\phi_1$ during which PLA 507 activates temporary registers 521 and 522. Registers 521 and 522 apply inputs to ALU 520 during this phase. During the following phase $\phi_2$, ALU 520 applies a valid output (data) to bus 525, and the Fetch PLA transfers that data into a selected user register (510 ... 517). The operation to this point results in the addition of two binary numbers stored in two user registers by moving those numbers to temporary registers and then driving the numbers through an ALU where addition occurs. The result is returned to a selected user register over the bus. The operation is summarized in TABLE I:

TABLE I

| Cycle | | Action (Single Cycle) |
|---|---|---|
| 1 | $\phi_1$ | Main PLA receives first valid opcode from I/O 527 |
| | $\phi_2$ | Main PLA applies valid output commands to Fetch and Arithmetic PLA's |
| 2 | $\phi_1$ | Fetch And Arithmetic PLA's have valid input command |
| | $\phi_2$ | Fetch PLA enables first selected user register; Arithmetic PLA enables first temporary register to receive data from bus; Main PLA outputs 2nd valid commands; assert data valid |
| 3 | $\phi_1$ | Fetch And Arithmetic PLA's receive second valid input command |
| | $\phi_2$ | Fetch PLA enables second selected user register Arithmetic PLA enables second temporary register to receive data from bus assert data valid |
| 4 | $\phi_1$ | temporary registers apply input data to ALU |
| | $\phi_2$ | ALU applies valid output data to bus, Fetch PLA latches data from bus to user register |

It is noted that tri-state buffer circuits 510A–517A are enabled by outputs from PLA 506 applied from output register 562 through a slave latch designated 562S. Such a latch is employed because register 562 is operated in a $\phi_2$ phase and circuits 510A–517A are operative in $\phi_1$ and $\phi_2$ phases of a subsequent cycle and therefore isolation is required. A similar organization is required for PLA 507 in activating slave register 550. In each of these cases, a master-slave relationship exists and an opportunity arises for introducing logic in a manner to utilize unused time. No advantage of such an opportunity is taken in these instances. The use of slave latch 557S similarly provides isolation as required for latch 550 and proper timing operation of temporary registers 521 and 522.

ALU 520 performs AND, OR, Add, Subtract, and Complement functions. If the registers 521 and 522 have contents represented by TA and TB, respectively, the functions are symbolized by (TA C$\underline{R}$ TB), (TA AND TB), (TA+TB), (TA−TB), and ($\overline{TA}$), respectively. Five bit register 550 determines the function performed and is itself enabled by an output from PLA 507 via line 558. The clock input to register 550 is connected to the output of AND circuit 552. One input to the AND circuit is connected to a clock source; the other to an output of output register 557 of PLA 507 via line 558. The output from PLA 507 over line 551 is operative to program register 550 in a manner to enable the various ALU operations in sequence. The output from PLA 507 over line 558 enables a clock pulse to select the appropriate operation.

Note that the clock to input registers 560, 561, and 559 of PLA's 505, 506, and 507 respectively is applied via inputs to AND circuits 563, 564, and 565, respectively. The second input to AND circuit 563 is connected to an output of register 562 of PLA 506. The second input to AND circuit 565 is connected to an output of register 562 also. The second input to AND circuit 564 is connected to an output of data I/O 526. The organization of the gated clock pulses is essentially as shown in FIGS. 5 and 6, being operative to selectively disable the Arithmetic PLA from stepping through its state diagram for selecting temporary registers and for determining the function of the ALU, etc.

Similarly, AND circuit 564 is operative responsive to a control signal from I/O 526 to enable selection of a next subsequent user register or memory address only when the prior fetch operation is completed. In the absence of such a signal, the clocks at the input registers 560 and 561 of PLA's 505 and 506 are inhibited. The signals may be understood as "assert data valid" signals or "handshake" signals and occur in the above example at cycle 2, phase $\phi_2$, and cycle 3, phase $\phi_2$. In cycle 2, phase $\phi_2$, the output from register 562 of PLA 506 selects the user register and enables output register 557 of PLA 507 to select the temporary register and AND circuit 552 to determine the function of ALU 520.

In cycle 3, phase $\phi_2$, the handshake is similar. The input register 560 of Main PLA 505 is connected to the output of AND circuit 563 in an arrangement similar to that of AND circuit 564 as noted hereinbefore. The handshake signals from PLA 506 are applied to selectively enable the clock at circuit 563 to permit outputs from PLA 505 to proceed to a next subsequent operation as would occur in cycle 3, phase $\phi_1$ in TABLE I.

When the output from the selected user from register (510–512) is an address to memory 501, an indeterminate number of cycles of operation may occur before the address is acquired as in the case, for example, when a disk file is searched. In such a multiple cycle of operation, cycle 2, phase $\phi_2$ of TABLE I is expanded as summarized in TABLE II.

TABLE II

| Cycle | Action (Multiple Cycle) |
|---|---|
| 2 $\phi_1$ | Fetch and Arithmetic PLA's have valid inputs commands |
| $\phi_2$ | Contents of selected user register applied to output latches of data I/O 526, |
| $\phi_1$ | No new command - address goes out on the pins |
| $\phi_2$ | Address goes from output latches into memory |
| $\phi_1$ | Memory responds to address, data ready? |
| $\phi_2$ | If data not ready, hold Fetch PLA (which in turn holds Main PLA) (i.e., no handshake signal to AND circuit 564;)-Repeat If data ready, latch input of data I/O 526 to enable clock at AND circuit 564. data from memory applied to bus 525 for storage in temporary store TA or TB. |

In the absence of a gated clock signal at the input registers of the Main, the Arithmetic, and Fetch PLA's, each of those PLA's would have to be considerably larger as discussed hereinbefore. Moreover, reduction in PLA size (and thus increased speed) is achieved whenever a gated clock signal is used. The use of a gated clock signal to an input register of a PLA (as shown in FIG. 6) or the use of a gate to gate data from or to an output register of a PLA (as shown in FIG. 10) achieves like savings. The architectural strategy of the microprocessor determines which gating means is employed or whether both are used in any particular case.

The organization of the PLA's in a control hierarchy permits each PLA to apply successive commands to elements, such as an ALU and temporary registers, which are dedicated to it. In this manner, independent independent PLA's may proceed with successive operations independently where a Main PLA is operative to initiate those independent operations. The handshaking signals indicate that the various independent operations have been completed, and the next subsequent command is permitted. Concurrent PLA execution resulting in pipelining of data manipulation (parallel processing) thus is achieved. The gating of clock signals to the PLA's of a microprocessor with a plurality of PLA's organized in a hierarchy is a powerful arrangement leading not only to size and overall speed advantages, but also to throughput advantages. The last-mentioned advantage arises because the independent PLA's can utilize cycle time which would otherwise be unavailable for use if only a single (relatively large) PLA were to be used.

The implementation of a control hierarchy herein may include a direct interconnection between an output register of one PLA and an input register to another. Such an interconnection is represented by line 600 in FIG. 10 and may be used in reset operations.

The invention has been described herein to include programmable logic arrays which are state machines having input and output latches. But there are other potential elements for use with the invention. For example, it is possible to employ the gated clock means and the hierarchical organization in a multiple ROM or ROM/PLA arrangement directed to the same end. Further, the gating of data or the gating of clock pulses may be considered embodiments of the use of logic between master and slave latches. The embodiment of FIG. 9, for example, does not show a gated clock. It does show logic circuitry between a master and a slave latch, which in FIG. 9 are the output register (latch) of a first PLA and the input register (latch) of a second PLA, respectively. Gated clock means for providing clock signals as shown in FIGS. 6, 8, and 10 also may be considered to constitute logic between a master latch and a slave latch. For example, in the embodiment of FIG. 10, the master latch and the slave latch are output and input registers, respectively. In any case, the master-slave relationship exists and logic circuitry is employed to utilize otherwise unused time. The inclusion of logic circuitry whether for gating clock signals or for manipulating data between input and output latches of a plurality of PLA's is considered particularly unique herein leading to the powerful PLA control hierarchy disclosed as was mentioned hereinbefore.

What has been described is considered merely illustrative of the principles of this invention. Various modifications of the invention can be devised by those skilled in the art in accordance with those principles within the spirit and scope of the invention as encompassed by the following claims. Specifically, the invention can be implemented in NMOS, PMOS, pseudoNMOS, CMOS, etc. integrated circuit technology as is apparent to one skilled in the art. Moreover, although the invention has been described in terms of enabling a clock pulse or enabling data to be applied to input registers, an alternative mode in which normally-present clock pulses are disabled can be implemented to this same end. Also, other than AND circuits may be used to manipulate data or the clock in otherwise unutilized time between consecutive clock pulses as described herein. Moreover, the invention need not be practiced in a single integrated circuit chip. Rather, components may be defined in more than one chip (or discrete component) and still take advantage of unused time as disclosed herein. In addition, as would be apparent to one skilled in the art, more than one input can be employed for gating a clock signal or data; more than one gate may be used also.

What is claimed is:

1. An integrated circuit structure including a first logic array having an associated input register for supplying first signals to said first logic array, and a second logic array having an associated output register for receiving second signals from said second logic array, said input and output registers being operative respectively in response to first and second phase clock pulses, clock means for applying clock pulses in said first and second phase and means for applying inputs to said input register, said structure being characterized by control means connected between said output register and said input register responsive to an output from said output register during each second phase clock pulse for controlling modification of selected ones of said second signals received in the output register during the next preceding second phase clock pulse.

2. An integrated circuit structure in accordance with claim 1 including a first and a second PLA wherein said first logic array comprises a decoder section of said first PLA and said second logic array comprises a ROM section of said second PLA including clock means for applying clock pulses in first and second phases, said structure being further characterized in that said control means is adapted to selectively apply clock pulses to said input register responsive to signals from said output register.

3. An integrated circuit structure in accordance with claim 2 also including a third logic array comprising a ROM section and having an associated output register and feedback loops between outputs of said associated output register of said third logic array and inputs to said decoder section of said first PLA, said structure being further characterized in that said control means is adapted to selectively manipulate signals from said associated output register of said third logic array to said input register of said decoder section of said first logic array responsive to signals from said output register of said ROM section of said third logic array.

4. An integrated circuit structure including at least first and second PLA's with first decoder and first ROM sections and with second decoder and second ROM sections respectively, said first and second decoder sections having associated therewith first and second input registers respectively, said input registers including gates and being operative in a first phase of a clock cycle to latch data, said first and second ROM sections having associated therewith first and second output registers respectively, said output registers including gates operative in a second phase of a clock cycle to latch data, a clock means for providing clock pulses in first and second phases, and first control means connected between said second output register and said first input register responsive to a first output signal from said second output register during a second phase for selectively enabling input to said first input register in the next subsequent first phase.

5. An integrated circuit structure in accordance with claim 4 wherein said structure also includes a third PLA having third decoder and third ROM sections with a third input register and a third output register associated therewith and operative in first and second phases respectively, and third control means connected between said third input register, means for applying an output signal from said output register of said second PLA to inputs to said third control means during a second phase for selectively enabling said third input register in next subsequent first phase.

6. An integrated circuit structure in accordance with claim 5 also including a second control means responsive to an output from said first input register during a second phase for selectively enabling said second input register of said second PLA in next subsequent first phase.

7. An integrated circuit structure in accordance with claim 6 also including an input-output latch, a fourth control means responsive to a first output from said input-output latch during a first phase for selectively enabling said second input register of said second PLA in next subsequent first phase.

8. A digital processor including first and second logic arrays having first input and output and second input and output registers, respectively, a first feedback path between at least said first output register and said first input register and means for electrically connecting an output of said second output register to an input of said first input register.

9. A digital processor in accordance with claim 8 also including at least a second feedback path between said second output register and said second associated input register wherein said arrays and register feedback paths implement first and second finite state machines respectively.

10. A digital processor in accordance with claim 8 also including means for electrically connecting the output of said first output register to the input of said second input register.

* * * * *

UNITED STATES PATENT AND TRADEMARK OFFICE
CERTIFICATE OF CORRECTION

PATENT NO. : 4,399,516

DATED : August 16, 1983

INVENTOR(S) : Donald E. Blahut, Marc L. Harrison, and Mark E. Thierbach

It is certified that error appears in the above-identified patent and that said Letters Patent is hereby corrected as shown below:

In the Heading, "Michael J. Killian, Eatontown;" should be omitted.

In the Specification, Column 1, line 49, "low" should read --low (high)--. Column 4, line 64, "logic" should read --logic unit (ALU)--. Column 6, line 14, "and" should read --and permits--.

In the Claims, Column 8, line 4, after "PLA", add a period and delete the rest of the claim.

Signed and Sealed this

Twenty-eighth Day of August 1984

[SEAL]

Attest:

GERALD J. MOSSINGHOFF

Attesting Officer

Commissioner of Patents and Trademarks